I. S. PARKE.
Amalgamating Pan.

No. 143,635. Patented Oct. 14, 1873.

Witnesses
John L. Borne
C. M. Richardson

Ira S. Parke
per Dewey &
Attys

UNITED STATES PATENT OFFICE.

IRA S. PARKE, OF VIRGINIA CITY, NEVADA.

IMPROVEMENT IN AMALGAMATING-PANS.

Specification forming part of Letters Patent No. 143,635, dated October 14, 1873; application filed December 11, 1872.

*To all whom it may concern:*

Be it known that I, IRA S. PARKE, of Virginia City, Storey county, State of Nevada, have invented an Improved Amalgamating-Pan; and I do hereby declare the following description and accompanying drawings are sufficient to enable any person skilled in the art or science to which it most nearly appertains to make and use my said invention or improvement without further invention or experiment.

My invention relates to an improved pan or tub for amalgamating the precious metals; and it consists in so constructing the pan and mullers as to keep up a constant central agitation, and at the same time secure a circular motion of the pulp; and the invention is designed as an improvement on my own patent of April 18, 1871, numbered 113,791.

In order to more fully illustrate and explain my invention, reference is had to the accompanying drawings forming a part of this specification, in which—

Figure 1:
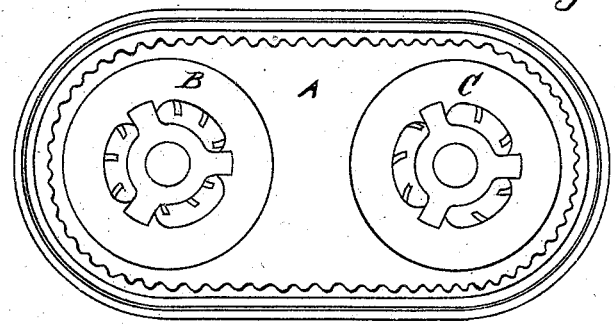
Figure 2:
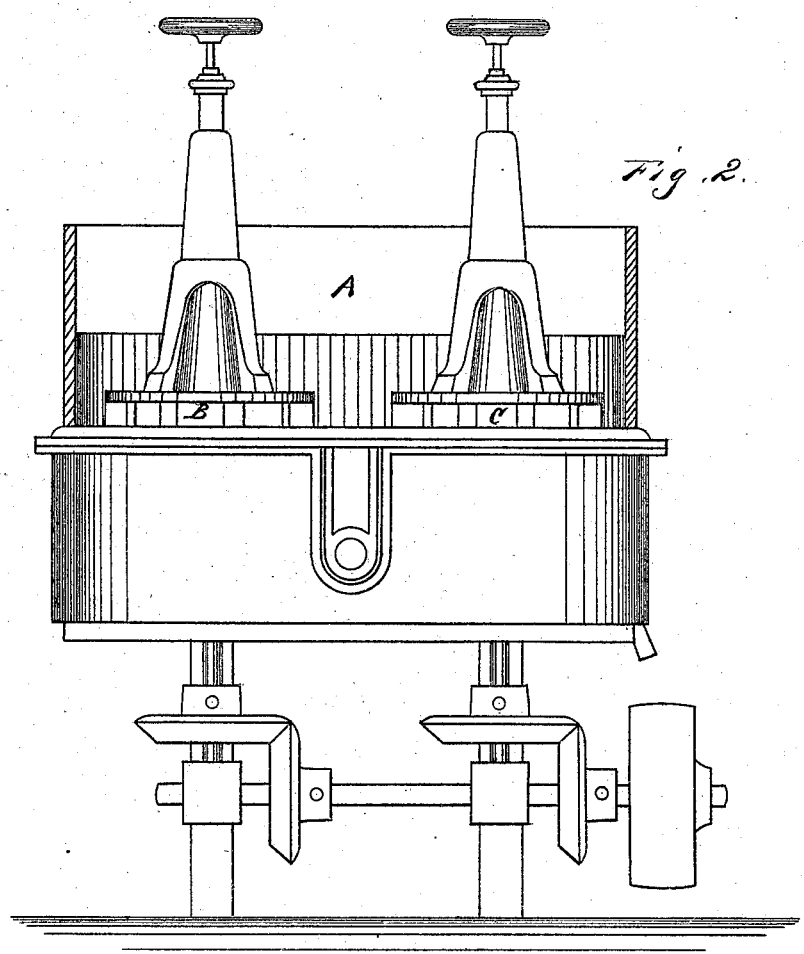

Figure 1 is a top view of my pan. Fig. 2 is a side elevation, with a section of the pan proper, showing the two mullers.

A is a pan or vessel, which, in the present instance, is represented as being constructed in an oval form, and of a sufficient size to accommodate two mullers, B C, inside of it.

The construction of the pan is similar to that described and claimed in the Letters Patent No. 113,791, which were granted to me on the 18th day of April, A. D. 1871; but the general plan of using two or more mullers in the same vessel can be carried out in an amalgamating pan or vessel of any ordinary construction.

I construct the mullers B C to be driven in the same direction, as the two currents formed by their revolution will then meet in the center of the vessel, and be thrown to each side, thus keeping up a constant central agitation and a circular motion of the pulp in the pan in the direction shown by the arrows.

Having thus described my invention, what I claim, and desire to secure by Letters Patent, is—

The amalgamating-pan A, provided with the mullers B C, driven in the same direction, substantially as and for the purpose set forth.

In witness whereof I hereunto set my hand and seal.

IRA S. PARKE. [L. S.]

Witnesses:
JOHN L. BOONE,
C. M. RICHARDSON.